Patented Sept. 19, 1922.

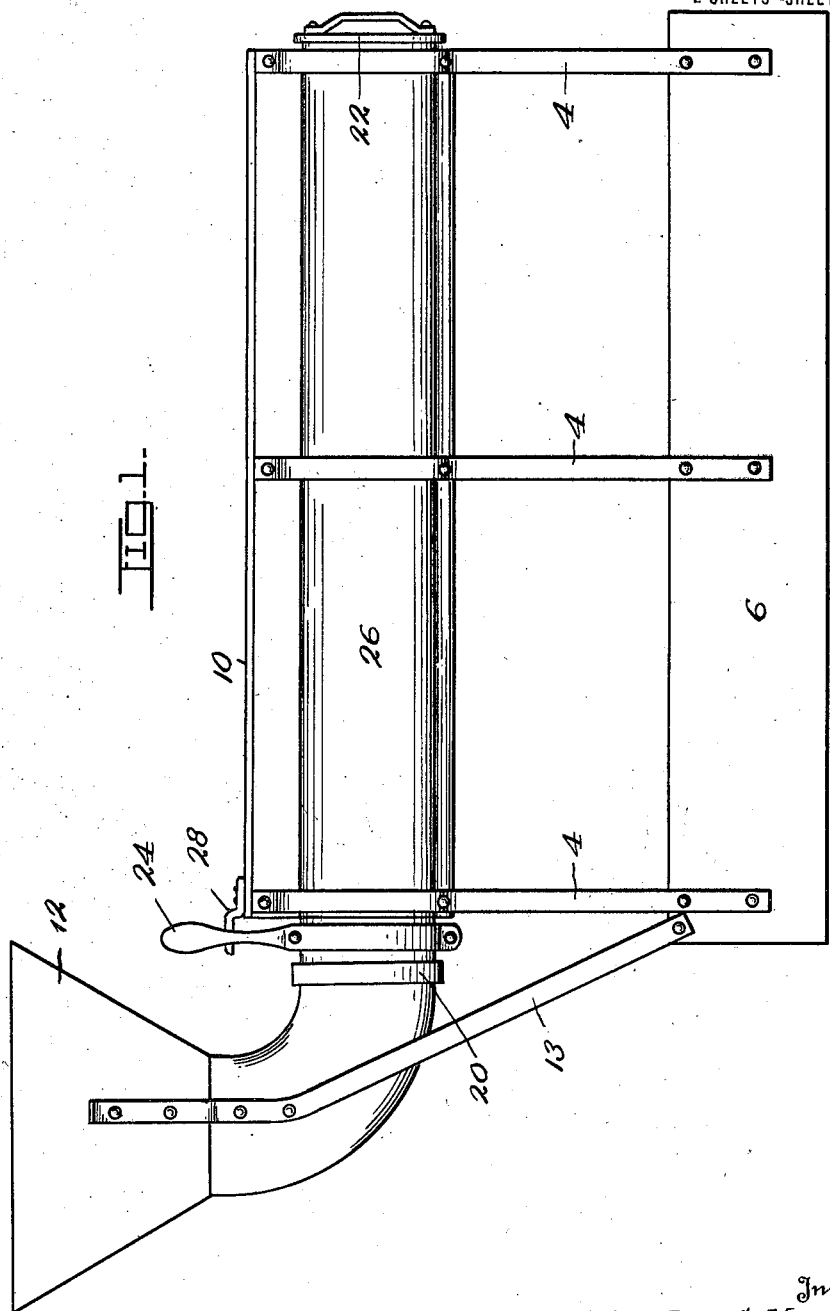

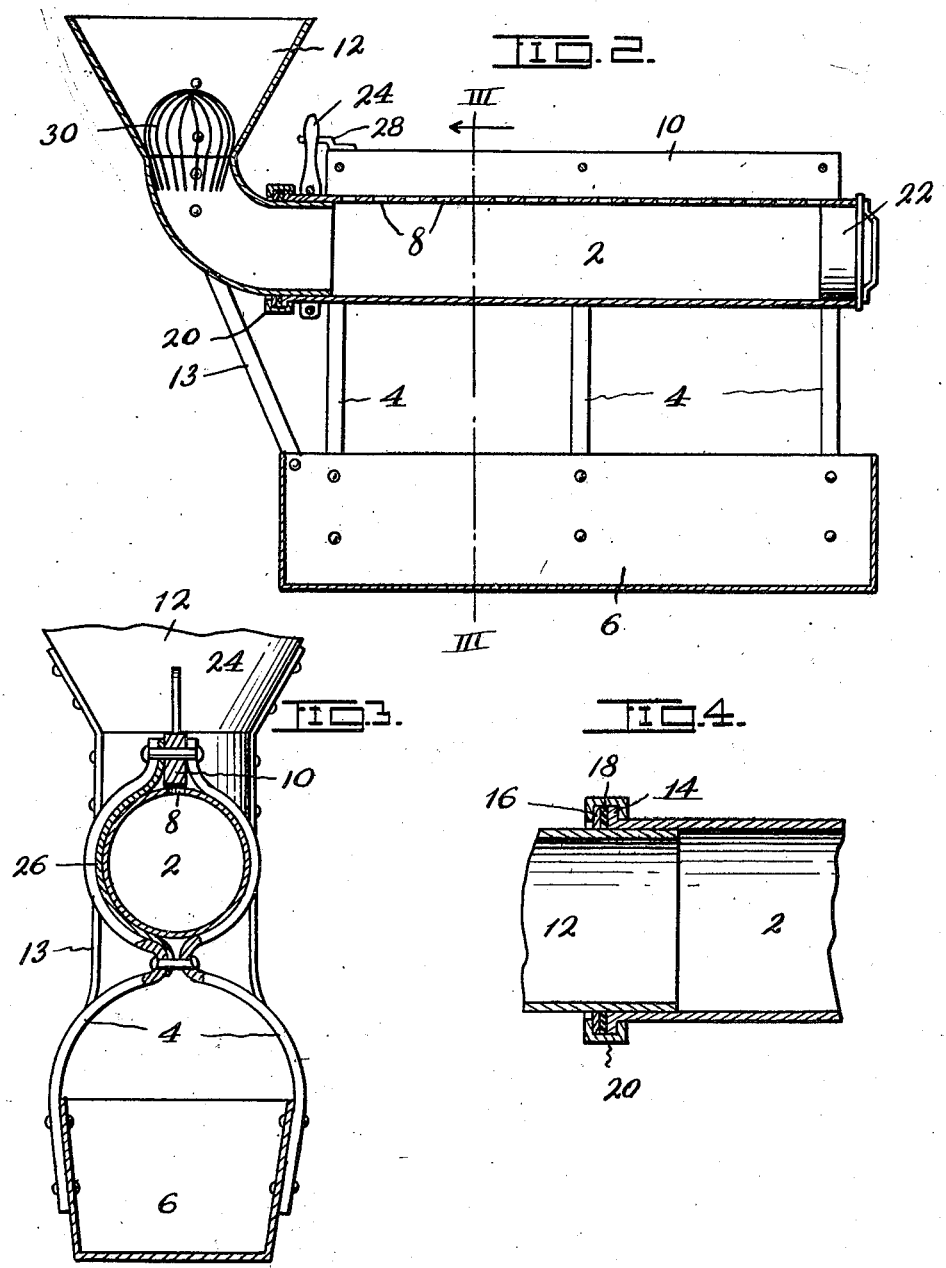

1,429,287

UNITED STATES PATENT OFFICE.

CHARLES G. HUGGINS, OF ADRIAN, MISSOURI, ASSIGNOR OF ONE-HALF TO BENJAMIN H. HUGGINS, OF ADRIAN, MISSOURI.

STOCK FEEDER.

Application filed April 18, 1921. Serial No. 462,121.

*To all whom it may concern:*

Be it known that I, CHARLES G. HUGGINS, a citizen of the United States, residing at Adrian, in the county of Bates, and State of Missouri, have invented certain new and useful Improvements in Stock-Feeders, of which the following is a specification.

My invention relates to stock feeders and is intended more particularly for feeding liquid food such as milk to hogs, calves, etc.

In its preferred embodiment the invention embraces a rotary conveyer having ports through which the food is discharged into a feed trough, and a hopper through which said conveyer is supplied with food.

In order that the invention may be fully understood, reference will now be had to the accompanying drawings, in which:

Fig. 1 is a side elevation of the feeder.

Fig. 2 is a vertical longitudinal section of the feeder.

Fig. 3 is an enlarged cross section on line III—III of Fig. 2.

Fig. 4 is an enlarged detail section of a liquid-tight joint between the hopper and the conveyer.

In carrying out the invention I employ a horizontally-disposed conveyer 2 which is rockably mounted in brackets 4 secured to a feed trough 6.

The conveyer 2 is provided with longitudinal series of discharge ports 8 adapted to be closed by a valve 10 when the conveyer 2 is rocked to carry said ports to the upper side as disclosed on Figs. 2 and 3. The valve 10 extends longitudinally of the upper portion of the conveyer 2 upon which it is held by the upper ends of the brackets 4.

The conveyer 2 is supplied with food through a hopper 12, the lower end of which extends into the adjacent end of the conveyer 2. A liquid-tight joint consisting of flanges 14 and 16 on the conveyer 2 and the hopper 12, respectively, an annular gasket 18 interposed between said flanges 14 and 16, and a flanged collar 20 engaging the flanges 14 and 16 to hold them in engagement with the gasket 18, serves to prevent the liquid from leaking out between the conveyer 2 and the hopper 12. The conveyer 2 is assisted in supporting the hopper 12 by braces 13 extending upwardly from the trough 6.

The end of the conveyer 2 farthest from the hopper 12 is provided with a removable plug 22, so that access may be had to the interior of said conveyer to clean the same and maintain it in a sanitary condition.

The conveyer 2 is provided at its end adjacent to the hopper 12 with a handle 24 whereby it may be rotated a half revolution to carry the ports 8 to the under portion of the conveyer 2, so that the food therein may flow outwardly through said ports 8 and into the trough 6.

The food is prevented from running out of the ports 8 while the conveyer 2 is being rotated a half revolution as above-stated, by a shield 26 extending longitudinally of the conveyer as more clearly disclosed on Fig. 1, and curved longitudinally to snugly fit against said conveyer 2 as disclosed by Fig. 3. A stop 28 fixed to the adjacent end of the valve 10 and extending to the rear end of the handle 24 prevents the same from being turned in the wrong direction.

Bones, sticks, and other débris likely to clog the ports 8, are prevented from entering the conveyer 2 by a strainer 30 located in the hopper 12.

In practice, by arranging the hopper 12 on one side of a fence and the rest of the apparatus within the feed pen containing the hogs or other animals to be fed, the annoyance caused by the animals crowding about the caretaker is avoided as he need not enter the pen but can deposit the feed in the hopper 12 on the outside of the fence.

By mounting the conveyer 2 to rock in the manner stated the ports 8 may be kept in raised position until said conveyer 2 is filled with food and then when rotated to lower the ports 8 the food will discharge equally fast through all of said ports and thus be uniformly distributed throughout the trough 6 where it is accessible to all of the animals, instead of discharging at one end of said trough and thus allowing some of the animals to get more than their share of the food. By arranging the conveyer 2 above the trough 6 as shown the animals are prevented from climbing into the trough and contaminating the same and its contents.

While I have shown and described the preferred construction, combination and arrangement of parts, I reserve the right to make such modifications as properly fall within the spirit and scope of the appended claims.

Having thus described my invention, what

I claim and desire to secure by Letters Patent is:

1. A stock feeder consisting of a rotary conveyer having a longitudinal series of discharge ports an open trough disposed beneath said conveyer, a valve extending longitudinally of the conveyer to close the ports when in raised position, means for rotating said conveyer to lower the ports so that the contents of said conveyer may flow through the ports into said trough, and an open hopper disposed above and at one end of the conveyer and having a swivel connection thereto.

2. A stock feeder consisting of a conveyer having a discharge port and which is rotatably mounted to raise and lower said discharge port, a stationary hopper communicating with one end of said conveyer, a liquid-tight swivel joint between the conveyer and said hopper an open trough beneath said conveyer and a stationary shield extending longitudinally of the conveyer and bearing against the same from the upper to the lower portion of the shield, for the purpose specified.

In testimony whereof I affix my signature, in the presence of two witnesses.

CHARLES G. HUGGINS.

Witnesses:
J. T. GILMOUR,
G. R. RAITINGER.